US007916318B2

(12) United States Patent
Nakamura et al.

(10) Patent No.: US 7,916,318 B2
(45) Date of Patent: Mar. 29, 2011

(54) IMAGE FORMING SYSTEM AND IMAGE FORMING METHOD

(75) Inventors: Akihiro Nakamura, Mishiima (JP); Atsuya Takahashi, Mishima (JP); Kaoru Sato, Minamiashigara (JP); Ryuichi Yoshizawa, Yokohama (JP); Kazuhisa Maruyama, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 858 days.

(21) Appl. No.: 11/429,334

(22) Filed: May 8, 2006

(65) Prior Publication Data

US 2006/0256354 A1 Nov. 16, 2006

(30) Foreign Application Priority Data

May 13, 2005 (JP) ................................ 2005-141211

(51) Int. Cl.
*G06K 15/00* (2006.01)
*G03G 15/00* (2006.01)

(52) U.S. Cl. .............. 358/1.14; 399/18; 399/21; 399/23

(58) Field of Classification Search .................. 399/367, 399/18, 21, 23, 388, 397, 405; 358/1.14
See application file for complete search history.

(56) References Cited

U.S. PATENT DOCUMENTS

| | | | | |
|---|---|---|---|---|
| 5,335,837 | A * | 8/1994 | Saeki et al. | 226/110 |
| 5,734,482 | A * | 3/1998 | Miyamoto et al. | 358/444 |
| 6,028,675 | A * | 2/2000 | Fields et al. | 358/1.14 |
| 7,190,916 | B2 | 3/2007 | Yoshizawa | 399/82 |
| 7,228,079 | B2 | 6/2007 | Brown et al. | 399/21 |
| 7,296,789 | B2 | 11/2007 | Fujii et al. | |
| 2004/0239976 | A1 | 12/2004 | Takahashi | 358/1.14 |
| 2006/0256393 | A1 | 11/2006 | Takahashi et al. | 358/404 |

FOREIGN PATENT DOCUMENTS

| | | |
|---|---|---|
| CN | 157713 | 2/2005 |
| JP | 2002-154744 | 5/2002 |
| JP | 2004-1511 | 1/2004 |

* cited by examiner

*Primary Examiner* — Benny Q Tieu
*Assistant Examiner* — Jeremiah Bryar
(74) *Attorney, Agent, or Firm* — Fitzpatrick, Cella, Harper & Scinto

(57) ABSTRACT

There is provided an image forming system that automatically discharges paper sheets other than poorly fed ones without making an emergency stop, even when poor paper feeding is caused due to a paper jam or the like. At paper feeding, information showing poor paper feeding is transmitted when the poor paper feeding is detected in supplying the paper sheets. At image forming, a determination is made whether the paper conveyance in forming the image is continued or stopped when an instruction, based on the information showing the poor paper feeding. At paper discharging, a determination is made whether the paper conveyance in discharging the paper sheets is continued or stopped when an instruction, based on the information showing the defective conveyance.

13 Claims, 6 Drawing Sheets

IMAGE FORMING SYSTEM AND IMAGE FORMING METHOD

BACKGROUND OF THE INVENTION

1. Field of the Invention

The present invention relates to an image forming system and the like in which a paper feed device or a paper discharge device is connected to an image forming device such as a printer. In particular, the present invention relates to an image forming system and the like for selectively determining whether paper conveyance is continued or stopped when poor feeding of paper sheets for image formation is caused.

2. Description of the Related Art

Conventionally, when poor paper feeding such as a paper jam is caused in an image forming system in which a paper feed device and a paper discharge device are connected to an image forming device, paper conveyance is generally stopped by emergently stopping the image forming system. For example, in Japanese Patent Application Laid-open No. 2004-001511, there is disclosed a system that is provided with an emergency stop instruction means in which an external controlling device gives an instruction for emergency stop to a printing device, and an emergency stop means in which a driving system in the printing device is stopped as soon as the instruction for emergency stop is given by the emergency stop instruction means. In this system, the external controlling device controls collectively the printing device and all optional devices which are attached to the printing device in the periphery thereof. In this system, the external controlling device stops the driving system of the printing device when something is wrong with the optional devices.

In Japanese Patent Application Laid-open No. 2002-154744, there is disclosed a system which judges whether or not residual paper sheets remaining from place to place on a conveyance path is automatically dischargeable after an emergency stop is once made. When a door of a device is opened, this system records, in a non-volatile memory, a stop position of a front edge of a recording medium at a moment when the emergency stop or a paper jam has occurred, as any one of a first section, a second section or a third section. The first section is one where the front edge is located certainly before a flapper. The second section is one where the front edge has certainly passed through the flapper. The third section is between the first section and the second section, and a section where the front edge has not yet certainly passed through just before the flapper. Next, this system determines whether or not the recording medium stopped on the conveyance path is automatically dischargeable, based on the recorded stop position of the front edge of the recording medium.

However, in the above described conventional art, a user needs to remove not only paper incapable of being conveyed but also paper remaining temporarily inside the device due to the emergency stop as the residual paper sheets. In addition, even in a system capable of automatically discharging paper sheets after the emergency stop, there is a case where it is difficult to automatically discharge the paper sheets in the emergency stop, depending on a kind of paper.

In addition, as for a method for automatic paper ejection, there is a method where all devices of an image forming device, a paper feed device, and a paper discharge device, the latter two of which are connected to the image forming device, are driven for a predetermined period in order to discharge paper sheets remaining temporarily in the device after an emergency stop of the device caused by occurrence of a paper jam. In this method, however, all the devices keep being driven for a predetermined period. Therefore, power consumption increases since the devices unrelated to the discharging operation of the paper sheets are also driven.

SUMMARY OF THE INVENTION

An object of the present invention is to provide an image forming system, an image forming method and the like for continuing automatically conveying (discharging) paper sheets in cases where conveyable paper sheets other than poor fed sheets remain, without making an emergency stop, even when a poor paper feeding is caused by a paper jam or the like.

Another object of the present invention, in addition, is to provide an image forming system, an image forming method and the like, which makes it possible to automatically convey (discharge) paper sheets in cases where conveyable paper sheets other than poor fed sheets remain, by operating a device effectively, when poor paper feeding is caused by a paper jam or the like.

According to the present invention, an image forming system comprises a paper feed device for supplying paper sheets, an image forming device for forming an image on the paper sheets, a paper discharge device for discharging the paper sheets on which the image has been formed, and a controlling unit for controlling a paper conveying state. The controlling unit transmits to the image forming device and the paper discharge device an instruction signal for instructing determination whether or not conveying operation is possible upon receipt of information about poor paper feeding from the paper feed device. The image forming device and the paper discharge device determine whether the paper conveying operation is continued or stopped according to the instruction signal.

According to the present invention, the image forming system comprises a paper feed device for supplying the paper sheets, an image forming device for forming an image on the paper sheets, a paper discharge device for discharging the paper sheets on which the image has been formed, and a controlling unit for controlling a paper conveying state. The controlling unit transmits to the image forming device a first instruction signal for instructing to stop conveying operation, upon receipt of information showing poor paper feeding from the paper discharge device. The image forming device stops the paper conveying operation in response to the first instruction signal, and transmits to the controlling unit information showing that the conveying operation has been stopped. The controlling device transmits to the paper feed device a second instruction signal for instructing to stop the conveying operation upon receipt of the information showing that the conveying operation has been stopped from the image forming device. The paper feed device stops the conveying operation in response to the second instruction signal.

The image forming method according to the present invention comprises a paper feeding step of supplying paper sheets, an image forming step of forming an image on the paper sheets, a paper discharging step of discharging the paper sheets on which the image has been formed, a first transmitting step of transmitting information showing poor paper feeding when the poor paper feeding is detected in the paper feeding step, a second transmitting step of transmitting an instruction signal for instructing determination whether or not conveying operation is possible in response of the information showing the poor paper feeding, and a determination step of determining whether the paper conveying operation is continued or stopped in the image forming step and the paper discharging step in response to the instruction signal.

The image forming method according to the present invention comprises a paper feeding step of supplying paper sheets, an image forming step of forming an image on the paper sheets, a paper discharging step of discharging the paper sheets on which the image has been formed, a first step of transmitting information showing poor paper feeding when the poor paper feeding is detected when discharging the paper sheets in the paper discharging step, a second step of transmitting a first instruction signal for instructing to stop conveying operation in response to the information showing the poor paper feeding, a third step of stopping the paper conveying operation in the image forming step in response to the first instruction signal and for transmitting the information showing that the conveying operation is stopped, a fourth step of transmitting a second instruction signal for instructing to stop the conveying operation in response to the information showing that the conveying operation is stopped, and a fifth step of stopping the conveying operation of the paper in the paper discharging step in response to the second instruction signal.

The image forming device according to the present invention comprises a paper feed device for supplying paper sheets and an image forming device for forming an image on the paper sheets. The image forming device includes a first controlling means for receiving a signal from outside the device and a second controlling means for controlling an image forming operation. The paper feed device transmits information showing poor paper feeding to the first controlling means when the poor paper feeding in the paper feed device is detected. The first controlling means transmits to the second controlling means an instruction signal for determining whether or not the paper conveying operation is possible, based on the information showing the poor paper feeding. The second controlling means determines whether or not the paper conveying operation is continued or stopped, based on the instruction signal from the first controlling means and the paper conveying state in the image forming device.

The image forming method according to the present invention comprises a step of transmitting information showing poor paper feeding in cases where the poor paper feeding is detected when paper sheets are fed from the paper feed device connected to the image forming device, a step of transmitting to the image forming device an instruction signal for determining whether or not the conveying operation of the paper is continued or stopped, based on the information showing the defective conveyance, and a step where the image forming device determines whether or not the paper conveying operation is continued or stopped, based on the instruction signal and the paper conveying state in the image forming device.

According to the present invention, each device can selectively determine whether or not paper conveyance is continued or stopped, based on a state of the device per se. Therefore, it is possible that paper sheets other than the sheets, which are difficult to be conveyed due to a paper jam or the like, can be automatically discharged, and hence it is possible to reduce the number of the sheets which need to be removed by a user when the poor paper feeding is caused. Thus, usability in printing operations is improved.

In addition, according to the present invention, since when a paper jam is caused, each device respectively determines whether or not to continue or stop the conveying operation, based on information transmitted from a video controller, and then performs the conveying operation. Therefore, it becomes possible that residual paper sheets in the device are effectively discharged.

The above and other objects, effects, features and advantages of the present invention will become more apparent from the following description of embodiments thereof taken in conjunction with the accompanying drawings.

The above and other objects, effects, features and advantages of the present invention will become more apparent from the following description of embodiments thereof taken in conjunction with the accompanying drawings.

BRIEF DESCRIPTION OF THE DRAWINGS

FIG. 3 is a sequential diagram for showing an example of a first processing at a time when poor paper feeding is caused due to paper jam or the like;

FIG. 4 is a sequential diagram for showing an example of a second processing at a time when poor paper feeding is caused due to paper jam or the like;

FIG. 5 is a sequential diagram for showing an example of a third processing at a time when poor paper feeding is caused due to paper jam or the like; and FIG. 6 is a sequential diagram for showing an example of a fourth processing at a time when poor paper feeding is caused due to paper jam or the like.

DETAILED DESCRIPTION OF THE PREFERRED EMBODIMENTS

Hereinafter, a detailed description of the preferred embodiments of the present invention will be given with reference to the accompanying figures.

Figure 1:
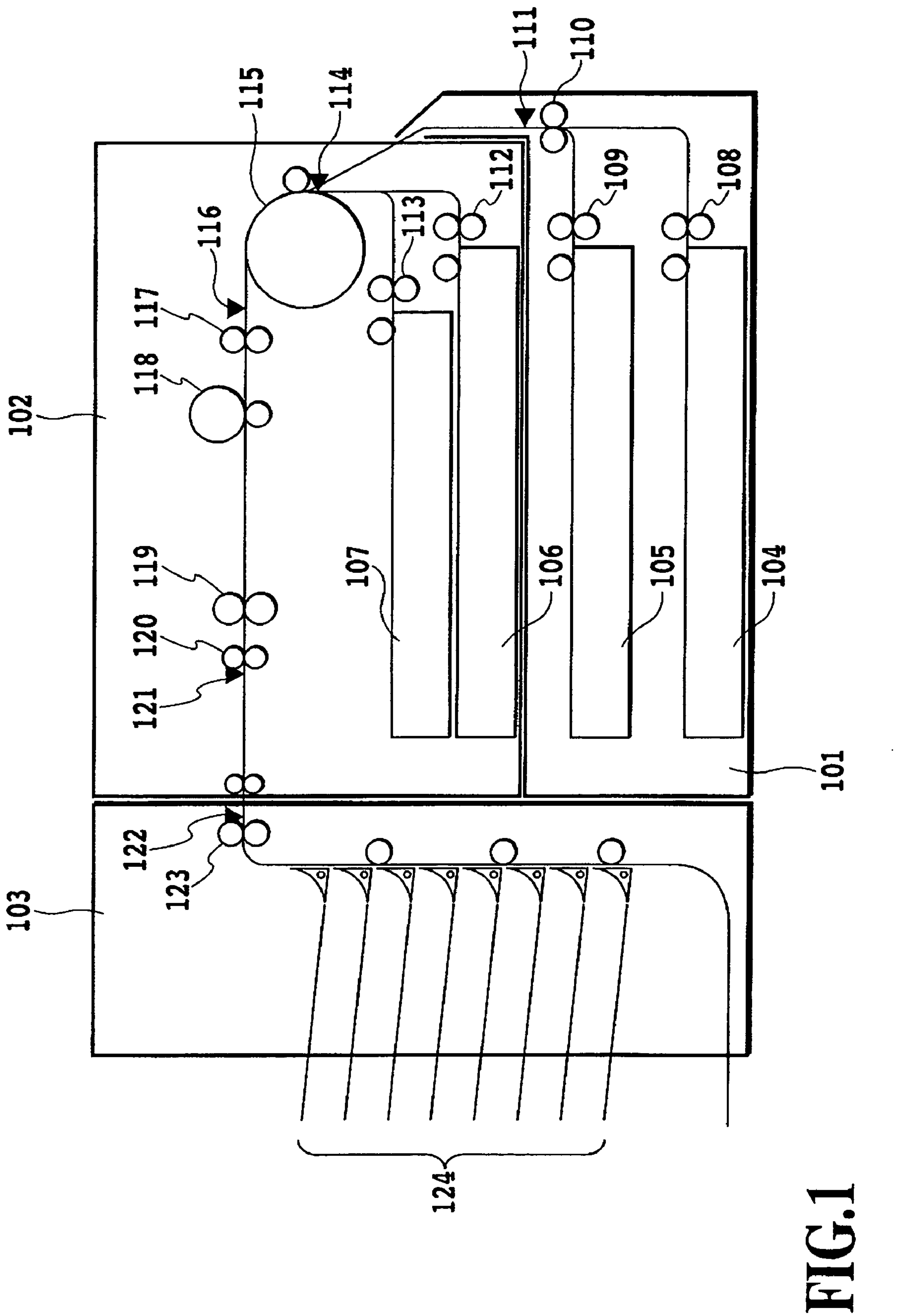
FIG. 1 is a block diagram for showing an embodiment of an image forming system of the present invention.

FIG. 1 is a block diagram for showing a configuration of an embodiment of the image forming system according to the present invention. In FIG. 1, the image forming system is configured of a paper feed device 101, an image forming device (printer) 102, and a paper discharge device 103.

The paper feed device 101 is provided with a lower deck 104, an upper deck 105, paper feed rollers 108 and 109 for feeding paper sheets stacked on each deck. Furthermore, the paper feed device 101 is provided with a conveyor roller 110 for conveying the paper sheets fed from each deck into the image forming device 102, and a paper outlet sensor 111 provided in the downstream of the conveyor roller 110.

The image forming device 102 is provided with a lower deck 106, an upper deck 107, paper feed rollers 112 and 113, and a paper feeding sensor 114 for detecting a paper sheet supplied from the paper feed device 101 and from the lower deck 106 or the upper deck 107. In addition, the image forming device 102 is provided with a paper feed and convey roller 115 for further conveying the supplied paper sheet. Moreover, the image forming device 102 is provided with a resist roller 117 for feeding the paper sheet until a predetermined loop is formed, and a paper sensor (hereinafter referred to as "pre-resist sensor") 116 for detecting the front edge of the paper sheet conveyed in order to form the loop. Besides, the image forming device 102 is provided with a photosensitive drum 118, a fixing device 119, a paper exit roller 120, and a paper exit roller sensor 121 that is located at the most downstream in the paper conveyance path of the image forming device 102 for monitoring a paper conveying state. The timing of starting rotation of the resist roller 117 is determined based on the timing when a front edge of the paper sheet is detected by the pre-resist sensor 116. In addition, in order to accurately transfer an image formed on the photosensitive drum 118 onto the paper sheet, timing for starting rotation of the resist roller 117 is controlled. For a predetermined period, since the pre-resist sensor 116 detects the front edge of the paper sheet, a state where the resist roller 117 is not driven is maintained, and the paper sheet is conveyed at a predetermined length in order to form the loop of paper. After the predetermined time, the resist roller 117 is rotatively driven to convey the paper sheet, and thereby the image on the photosensitive drum 118 is transferred onto the paper sheet. After that, the paper sheet on which the image has been transferred is discharged from the image forming device 102 to the paper discharge device 103 through the fixing device 119 and the paper exit roller 120.

The paper discharge device 103 detects the paper discharged from the image forming device 102 with an inlet sensor 122, takes in and conveys the paper sheet with a conveyor roller 123, and discharges it to any of designated paper discharging bins 124.

Figure 2:
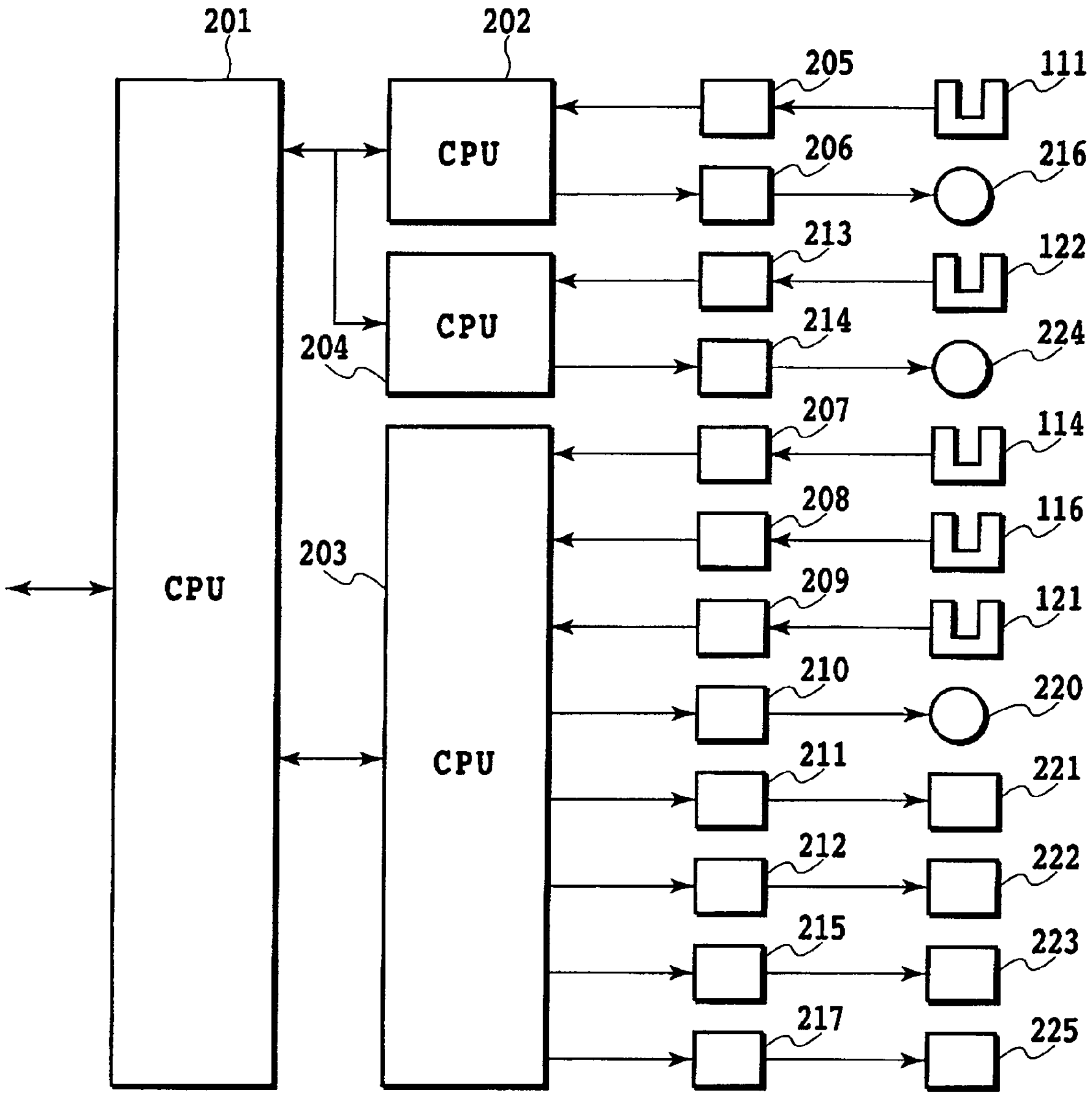
FIG. 2 is a block diagram for showing a configuration of an image forming device 102 in the embodiment of the present invention.

FIG. 2 is a block diagram for showing a configuration of the image forming device 102, or the like according to the present invention. In FIG. 2, reference numeral 201 is a video controller CPU mounted on a video controller for controlling the image forming device 102, which carries out processing of image data and commands which are transmitted from a host computer. Reference numeral 202 is a paper feed device control CPU for controlling the paper feed device 101. Reference numeral 203 is an image forming engine CPU for controlling an image forming engine (printer engine). Reference numeral 204 is a paper discharge device control CPU for controlling the paper discharge device 103. Each CPU controls the respective devices in communicating interactively each other.

Reference numeral 205 is a sensor input circuit that enters a detection signal of the outlet sensor 111 in the paper feed device 101 into the paper feed device control CPU 202. Reference numeral 206 is a driving circuit of a motor 216 for rotating the paper feed rollers 108 and 109, and the conveyor roller 110 of the paper feed device 101, which is controlled by a driving signal outputted from the paper feed device control CUP 202. The paper feed device control CPU 202 feeds or conveys paper sheets from a desired deck in accordance with a paper feeding instruction or a conveyance instruction transmitted from the video controller CPU 201.

Reference numerals 207, 208, and 209 are input circuits of, respectively, the paper feeding sensor 114, the pre-resist sensor 116, and the paper exit roller sensor 121 positioned on the conveyance path in the image forming device 102. These input circuits enter the detecting signal into the image forming engine CPU 203.

Reference numeral 210 is a driving circuit of a main motor 220 for driving all the rollers and photosensitive rollers in the image forming device 102, which is controlled by the driving signal outputted from the image forming engine CPU 203. Reference numeral 211 is a driving circuit of a clutch 221 for transferring the rotation of the main motor 220 to the paper feed-convey roller 115, which is controlled by the driving signal outputted from the image forming engine CPU 203. Reference numeral 212 is a driving circuit of a clutch 222 for transferring the rotation of the main motor 220 to the resist roller 117. The driving circuit 212 allows the clutch 222 to turn on/off by the driving signal outputted from the image forming engine CPU 203. Reference numeral 215 is a driving circuit of a clutch 223 for transferring the rotation of the main motor 220 to the fixing device 119. Reference numeral 217 is a driving circuit of a clutch 225 for transferring the rotation of the main motor 220. The driving circuits 215 and 217 allow the clutches to turn on/off by the driving signal outputted from the image forming engine CPU 203. Turning on/off the driving system for paper supplying and conveying sides in the image forming device 102 (the paper feed rollers 112 and 113, the paper feed-convey roller 115, and the photosensitive drum 118) and turning on/off the driving system for paper discharging (the fixing device 119 and the paper exit roller 120) are independently controlled.

The image forming engine CPU 203 conveys the paper sheet to the paper discharge device 103 corresponding to a conveyance instruction transmitted from the video controller CPU 201.

Reference numeral 213 is a sensor input circuit that enters a detecting signal of the inlet sensor 122 in the paper discharge device 103 into the paper discharge device control CPU 204. Reference numeral 214 is a driving circuit of a motor 224 for rotating the conveyor roller 123 of the paper discharge device 103, which is controlled by a driving signal outputted from the paper discharge device control CPU 204. The paper discharge device control CPU 204 conveys the paper sheet from the image forming device 102 by a conveyance instruction transmitted from the video controller CPU 201.

Example of First Processing

Figure 3:
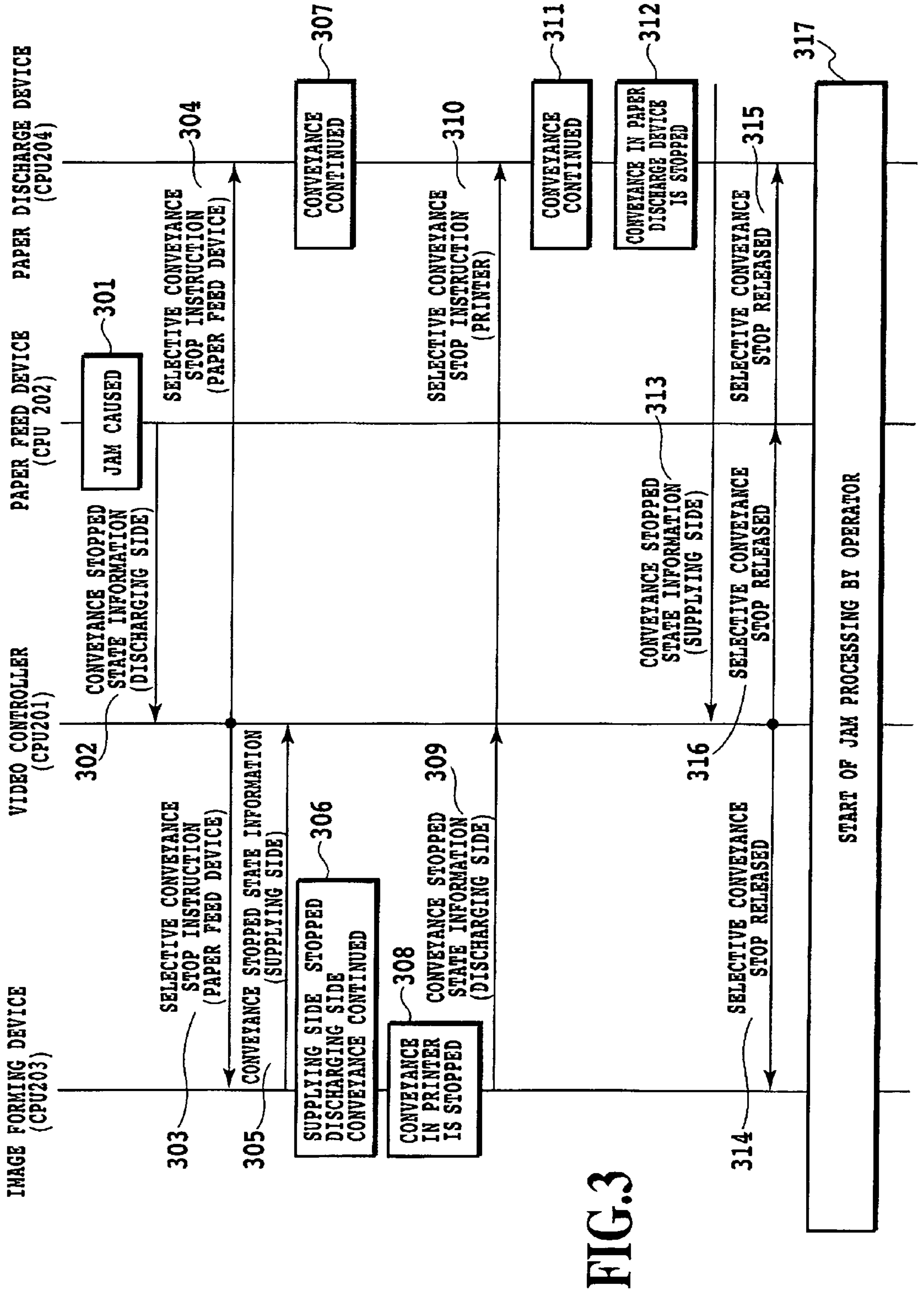

FIG. 3 is a sequential diagram for showing an example of a first processing at a time when poor paper feeding (such as paper jam) is caused in the paper feed device 101. This sequential diagram shows control information and a command (an instruction signals) transmitted/received between the video controller CPU 201 and the paper feed device control CPU 202. Additionally, this sequential diagram shows control information and a command (an instruction signal) transmitted/received between the video controller CUP 201 and the image forming engine CPU 203. Moreover, this sequential diagram shows control information and a command (an instruction signal) transmitted/received between the video controller CPU 201 and the paper discharge device control CPU 204. Furthermore, this sequential diagram shows a flow of controlling the video controller CPU 201, the paper feed device control CPU 202, the image forming engine CPU 203, and the paper discharge device control CPU 204.

When a paper jam is caused in the paper feed device 101 (Step 301), the paper feed device control CPU 202 detects the paper jam at Step 302. Next, the paper feed device control CPU 202 stops conveyance in the paper feed device 101, and transmits to the video controller CPU 201 conveyance stop state information showing that the conveyance on a paper discharging side in the paper feed device 101 is stopped.

At Steps 303 and 304, the video controller CPU 201 which has received the conveyance stop state information transmits a selective conveyance stop instruction to both the image forming device 102 such as a printer and the paper discharge device 103.

The image forming device 102 and the paper discharge device 103, which have received the selective conveyance stop instruction, determine per se whether to continue or to immediately stop the conveyance, based on whether or not there is sheets of paper capable of being conveyed. In the present processing example, as described later, the image forming device 102 stops paper conveyance immediately and the paper feed device 103 continues paper conveyance.

At Step 305, the image forming device 102, which has received the selective conveyance stop instruction, transmits to the video controller CPU 201 conveyance stop information showing that the paper conveyance on a paper supplying side is stopped. Then, at Step 306, the image forming device 102 stops to convey the sheets of paper, on the paper supplying side in the image forming device 102, whereas continues to convey the sheets of paper on the paper discharging side. That is, at Step 308, the image forming device 102 stops conveying the sheets of paper after the image forming device 102 finishes discharging to the paper discharge device 103 all the sheets of paper which exist and are capable of being conveyed in the image forming device 102. Then, at Step 309, the image forming device 102 transmits the conveyance stop state information to the video controller CPU 201.

At Step 310, the video controller CPU 201, which has received the conveyance stop state information, transmits to the paper discharge device 103 a selective conveyance stop instruction showing that the operation of the paper conveyance on the paper supplying side in the image forming device 102 is stopped.

At Step 311, the paper discharge device 103 continues to convey the sheets of paper even after receiving the selective conveyance stop instruction.

At Step 312, the paper discharge device 103 stops conveying the sheets of paper after all the sheets of paper which exist and are capable of being conveyed in the paper discharge device 103 are completely discharged.

Next, the paper discharge device 103 transmits to the video controller CPU 201 the conveyance stop state information showing that the paper conveyance is stopped. The video controller CPU 201 releases the state of the selective conveyance stop upon receipt of the conveyance stop state information showing that the paper conveyance is stopped from all the devices, which are the paper feed device 101, the image forming device 102, and the paper discharge device 103. In order to release the state of the selective conveyance stop, at Steps 314, 315, and 316, the video controller CPU 201 transmits an instruction for releasing the selective conveyance stop to the image forming device 102, the paper feed device 101, and the paper discharge device 103.

Lastly, at Step 307, an operator starts a normal process for the paper jam and each device returns to a normal sequence.

As described above, according to the present processing example, in cases where a paper jam is caused in the paper feed device 101 and conveyable sheets of paper exist in the image forming device 102, these sheets are discharged to the paper discharge device 103. Thereby, it becomes possible to reduce residual paper sheets which a user should remove.

Besides, when a paper jam is caused in the paper feed device 101, the image forming device 102 and the paper discharge device 103 carry out the conveying operation by respectively determining whether or not to continue the conveying operation, based on the information transmitted from the video controller. Therefore, the paper discharge device 103 is capable of effectively discharging the residual paper sheets in the device.

Example of Second Processing

Figure 4:
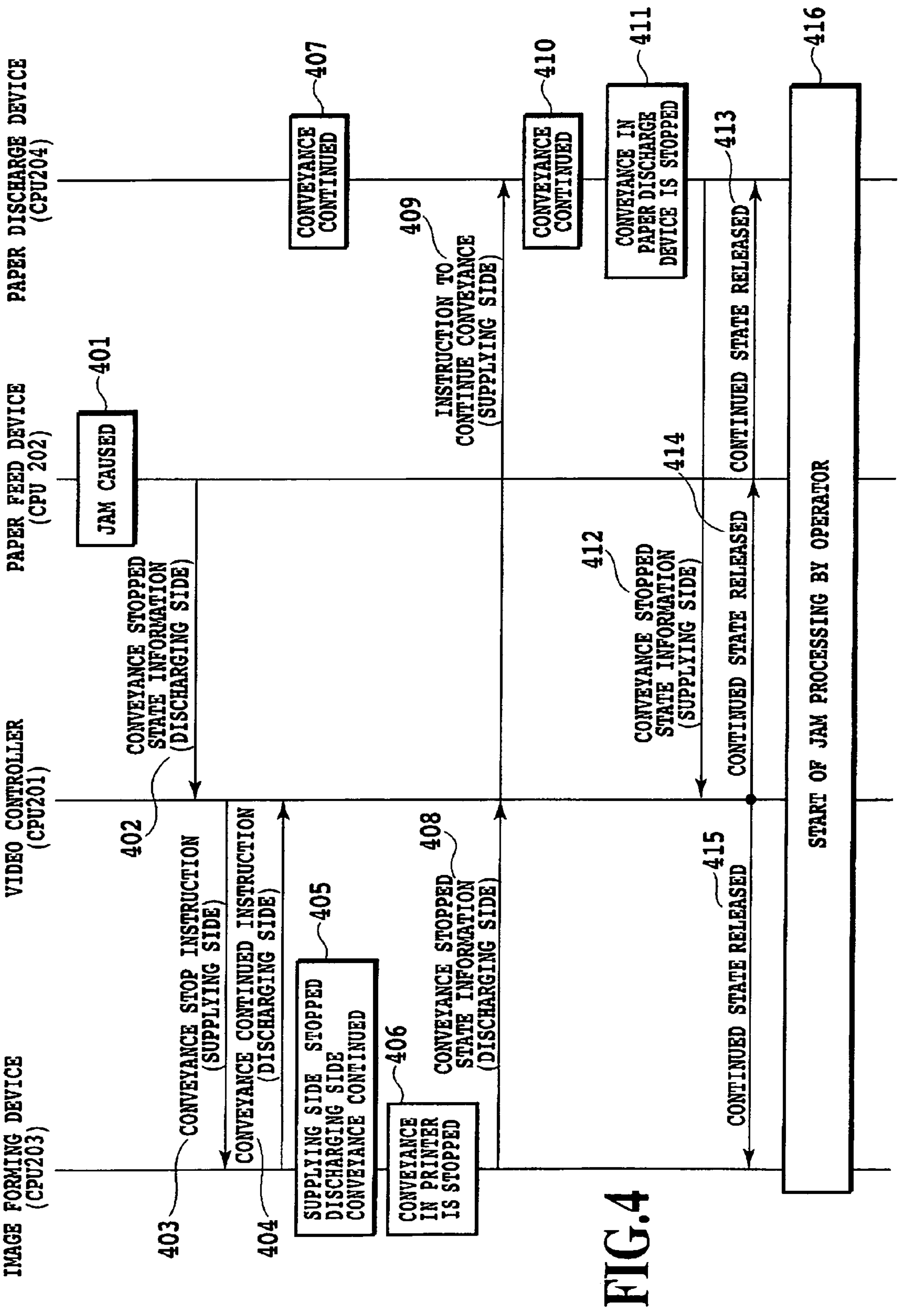

FIG. 4 is a sequential diagram for showing an example of a second processing at a time when poor sheet feeding is caused in the paper feed device 101 due to the paper jam or the like. This sequential diagram shows control information and a command (an instruction signal) transmitted/received between the video controller CPU 201 and the paper feed device control CPU 202. Furthermore, this sequential diagram shows control information and a command (an instruction signal) transmitted/received between the video controller CPU 201 and the image forming engine CPU 203. Moreover, this sequential diagram shows control information and a command (an instruction signal) transmitted/received between the video controller CPU 201 and the paper discharge device control CPU 204. Furthermore, this sequential diagram shows a flow of controlling the video controller CPU 201, the paper feed device control CPU 202, the image forming engine. CPU 203, and the paper discharge device control CPU 204.

When a paper jam is caused in the paper feed device 101 (Step 401), the paper feed device control CPU 202 detects the paper jam at Step 402. Next, the paper feed device control CPU 202 stops conveyance in the paper feed device 101, and transmits to the video controller CPU 201 conveyance stop state information showing that the conveyance on the paper discharging side in the paper feed device 101 is stopped.

At Steps 403 and 404, the video controller CPU 201, which has received the conveyance stop state information, determines an operation of the image forming device 102, and transmits to the image forming device 102 an instruction to stop the conveyance (on the supplying side) and an instruction to continue the conveyance (on the discharging side).

At Step 405, the image forming device 102, which has received the instruction to stop the conveyance (on the supplying side) and the instruction to continue the conveyance (on the discharging side), stops the paper conveyance on the supplying side, and continues the paper conveyance on the discharging side. That is, at Step 406, the image forming device 102 stops the paper conveyance in the image forming device 102 after sheets of paper, which exist and are capable of being conveyed in the image forming device 102, are discharged to the paper discharge device 103. Next, at Step 408, the image forming device 102 transmits the conveyance stop state information to the video controller CPU 201.

At Step 409, the video controller CPU 201, which has received the conveyance stop state information, transmits the instruction to continue the paper conveyance to the paper discharge device 103. It should be noted that the paper discharge device 103 currently continues the paper conveyance at this time (Step 407).

At Step 410, the paper discharge device 103, which has received the instruction to continue conveyance, continues the paper conveyance.

At Step 411, the paper discharge device 103 stops the paper conveyance after all sheets of paper, which exist and are capable of being conveyed in the paper discharge device 103 is completely discharged.

At Step 412, the paper discharge device 103 transmits to the video controller CPU 201 the conveyance stop state information showing that the paper conveyance in the paper discharge device 103 is stopped.

The video controller CPU 201 releases the conveyance continuing state upon receipt of the conveyance stop state information showing that the paper conveyance is stopped from all the devices of the paper feed device 101, the image forming device 102, and the paper discharge device 103. In order to release the conveyance continuing state, at Steps 413, 414, and 415, the video controller CPU 201 transmits an instruction to release the conveyance continuing state to the image forming device 102, the paper feed device 101, and the paper discharge device 103.

Lastly, at Step 416, an operator starts a normal process for a paper jam and each device returns to a normal sequence.

As described above, according to the present processing example, in cases where a paper jam is caused in the paper feed device 101 and conveyable sheets of paper exist in the image forming device 102, these sheets are discharged to the paper discharge device 103. Thereby, it becomes possible to reduce residual paper sheets which a user needs to remove.

Example of Third Processing

Figure 5:
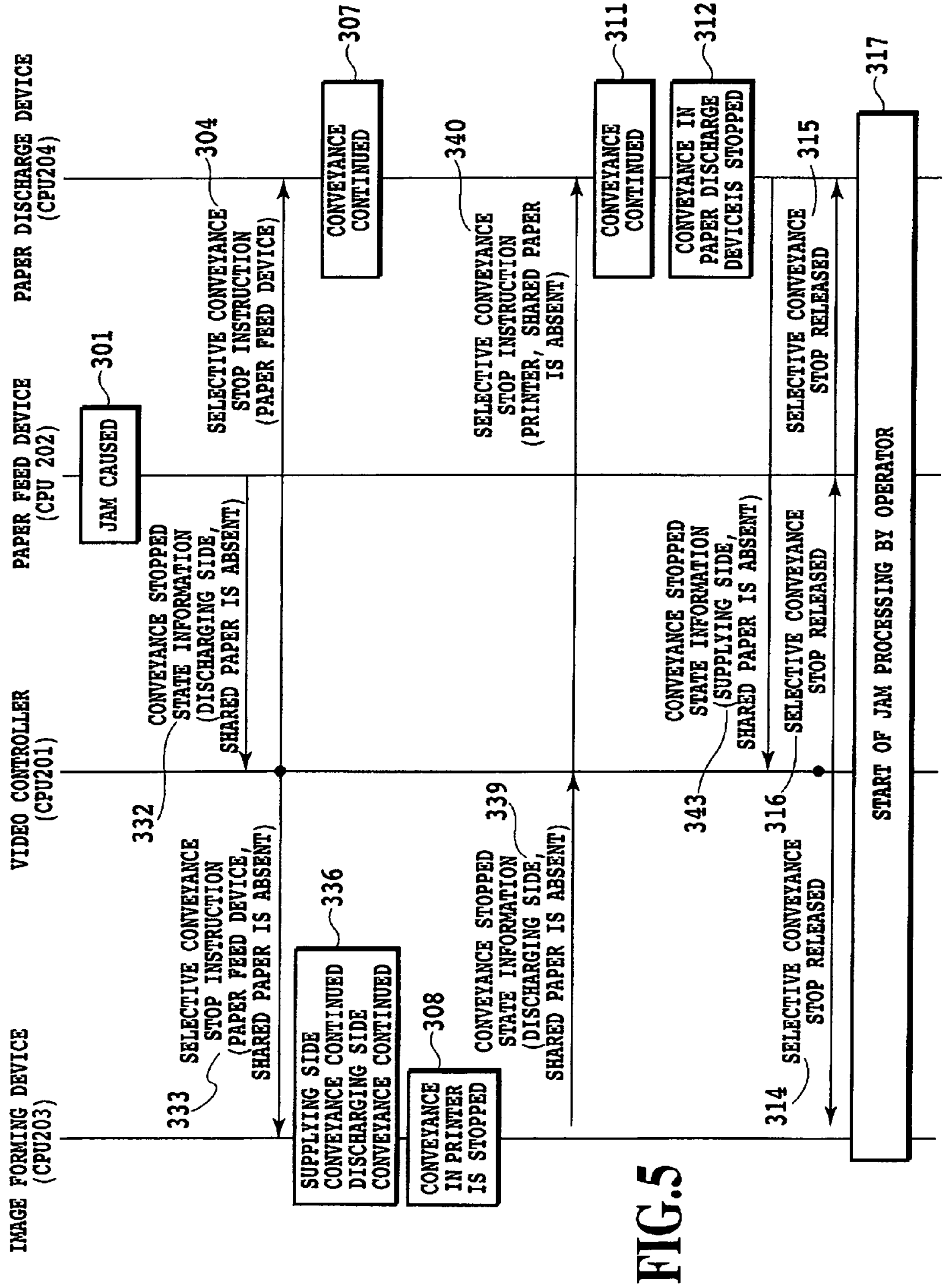

FIG. 5 is a sequential diagram for showing an example of a third processing in cases where poor paper feeding (such as a paper jam) is caused in the paper feed device 101 due to the paper jam or the like. This sequential diagram shows control information and a command (an instruction signal) transmitted/received between the video controller CPU 201 and the paper feed device control CPU 202. Furthermore, this sequential diagram shows control information and a command (an instruction signal) transmitted/received between the video controller CPU 201 and the image forming engine CPU 203. Moreover, this sequential diagram shows control information and a command (an instruction signal) transmitted/received between the video controller CPU 201 and the paper discharge device control CPU 204. Furthermore, this sequential diagram shows a flow of controlling the video controller CPU 201, the paper feed device control CPU 202, the image forming engine CPU 203, and the paper discharge device control CPU 204.

In this example of the present processing, information whether or not shared paper sheets are present is used. The shared paper sheets mean paper sheets that remain over the image forming device 102 and the paper feed device 101, or over the image forming device 102 and the paper discharge device 103.

When a paper jam is caused in the paper feed device 101 (Step 301), at Step 322, the paper feed device control CPU 202 detects the paper jam and stops conveyance in the paper feed device 101. Next, the paper feed device control CPU 202 transmits to the video controller CPU 201 conveyance stopped state information showing that conveyance on a paper discharging side in the paper feed device 101 is stopped. The conveyance stopped state information also includes information showing whether or not a paper sheet is shared between the paper feed device 101 and the image forming device 102, or between the image forming device 102 and the paper discharge device 103. The information showing whether or not the paper sheet is shared can be obtained by monitoring states of the sensors 111, 114, 121, and 122 shown in FIG. 2. For example, if the sensor 111 in the paper feed device 101 is turned on and the sensor 114 in the image forming device 102 is turned on, it is determined that the paper sheet is jammed over the paper feed device 101 and the image forming device 102. In addition, if the sensor 121 in the image forming device 102 is turned on and the sensor 122 in the paper discharge device 103 is turned on, it is determined that the paper sheet is jammed over the image forming device 102 and the paper discharge device 103.

In this example of the present processing, a case where the paper sheet is not shared between the devices is shown. In this case, as described later, the image forming device 102 continues the conveyance on the supplying side.

When a paper jam is caused in the paper feed device 101 (Step 301), at Step 332, the paper feed device control CPU 202 detects the paper jam, and stops the conveyance in the paper feed device 101. Next, the paper feed device control CPU 202 transmits to the video controller CPU 201 conveyance stopped state information showing that the conveyance on the paper discharging side in the paper feed device 101 is stopped and a shared paper sheet is absent.

The video controller CPU 201, which has received the conveyance stopped state information at Step 332, transmits a selective conveyance stop instruction to both the image forming device 102 such as a printer and the paper discharge device 103.

The image forming device 102 and the paper discharge device 103, which have received the selective conveyance stop instruction, determine whether the conveyance is continued or the conveyance is immediately stopped. In the present processing example, the image forming device 102 received information showing "a shared paper sheet is absent" according to the selective conveyance stop instruction, and thereby, at Step 336, it continues the conveyance on the paper supplying side and the paper discharging side. On the other hand, the paper discharge device 103 also continues the conveyance. Then, at Step 308, the image forming device 102 stops the conveyance after all the sheets of paper, which exist and are capable of being conveyed in the image forming device 102, are completely discharged to the paper discharge device 103.

Next, at Step 339, the image forming device 102 transmits to the video controller CPU 201 the conveyance stopped state information showing that conveyance in the image forming device 102 is stopped. The video controller CPU 201, which has received the conveyance stopped state information, transmits a selective conveyance stop instruction to the paper discharge device 103 at Step 340. Since a sheet of paper is not shared between the image forming device 102 and the paper discharge device 103 in the present processing example, the information showing that "a shared paper sheet is absent" is also transmitted to the paper discharge device 103. The paper discharge device 103, which has received the selective conveyance stop instruction, continues the conveyance at Step 311.

The paper discharge device 103 stops the conveyance at Step 312 after all the sheets of paper, which exist and are capable of being conveyed in the paper discharge device 103, are completely discharged.

Subsequently, at Step 343, the paper discharge device 103 transmits to the video controller CPU 201 the conveyance stopped state information showing that the conveyance is stopped. The video controller CPU 201 releases the selective conveyance stopped state upon receipt of the conveyance stopped state information showing that the paper conveyance is stopped from all the devices of the paper feed device 101, the image forming device 102, and the paper discharge device 103. In order to release the selective conveyance stopped state, at Steps 314, 315, and 316, the video controller CPU 201 transmits an instruction to release the selective conveyance stopped state to the image forming device 102, the paper feed device 101 and the paper discharge device 103.

Lastly, at Step 317, an operator starts a normal process for a paper jam and each device returns to a normal sequence.

It should be noted that the following processing is carried out when a shared paper sheet is present.

For example, when a paper jam is caused in the paper feed device 101, the paper feed device control CPU 202 detects the paper jam, and stops conveyance in the paper feed device 101. Next, the paper feed device control CPU 202 transmits it to the video controller CPU 201 that paper conveyance on a paper discharging side in the paper feed device 101 is stopped. Furthermore, the paper feed device control CPU 202 transmits to the video controller CPU 201 conveyance stopped state information showing that a sheet of paper is shared between the image information device 102 and the paper feed device 101 (the sensors 111 and 114 are turned on).

Upon receipt of the information, the video controller CPU 201 transmits the selective conveyance stop instruction together with information showing "a shared paper sheet is present" to the CPU 203 of the image forming device 102 and the CPU 204 of the paper discharge device 103.

The CPU 203 of the image forming device 102 stops driving operation on a supplying side and continues driving operation on a discharging side based on the selective conveyance stop instruction and the information showing that "a shared paper sheet is present". In addition, the CPU 204 of the paper discharge device 103 continues the conveyance operation. Since the subsequent operations are the same as those of the case when “a shared paper sheet is absent”, the description is omitted.

In addition, when a paper jam is caused in the paper discharge device 103, the paper discharge device control CPU 204 detects the paper jam, and stops conveyance in the paper discharge device 103. Next, the paper discharge device control CPU 204 transmits it to the video controller CPU 201 that the conveyance on paper supplying side in the paper discharge device 103 is stopped. Furthermore, the paper discharge device control CPU 204 transmits to the video controller CPU 201 conveyance stopped state information showing that the paper sheet is shared between the image forming device 102 and the paper discharge device 103 (the sensors 121 and 122 are turned on).

Upon receipt of the information, the video controller CPU 201 transmits a selective conveyance stop instruction together with the information showing that “a shared paper sheet is present” to the CPU 203 of the image forming device 102 and the CPU 202 of the paper feed device 101.

Upon receipt of the selective conveyance stop instruction and the information showing that “a shared paper sheet is present”, the CPU 203 of the image forming device 102 stops driving on the supplying side and discharging side. In addition, upon receipt of the selective conveyance stop instruction and the information showing that “a shared paper sheet is present”, the CPU 202 of the paper feed device 101 also stops conveyance operation.

In other words, upon receipt of the information showing that “a shared paper sheet is present”, the CPU 203 and CPU 202 will carry out the following processing. The CPU 203 and CPU 202 control the devices in order to continue a part of the conveyance operation in cases where the paper sheet is shared between the image forming device 102 and the paper feed device 101 when the paper jam is caused in the paper feed device 101. The CPU 203 and CPU 202 control the devices in order not to continue the conveyance operation in cases where the paper sheet is shared between the image forming device 102 and the paper discharge device 103 when the paper jam is caused in the paper discharge device 103.

According to the present processing example, the paper discharge device control CPU 204 also transmits the information whether or not a shared paper sheet, that is, a paper sheet remaining over the devices, is present. Therefore, devices, located in the downstream of a device in which the poor paper feeding is caused, can accurately determine which part of conveyor rollers has to be stopped. Thereby it becomes easy to discharge the paper sheets in conveying process in the devices without being damaged.

It should be noted that the information showing that “a sheared paper sheet is absent, or a shared paper sheet is present”, which is described in the third processing example, can be applied to the sequence of the second processing example.

Example of Fourth Processing

Figure 6:
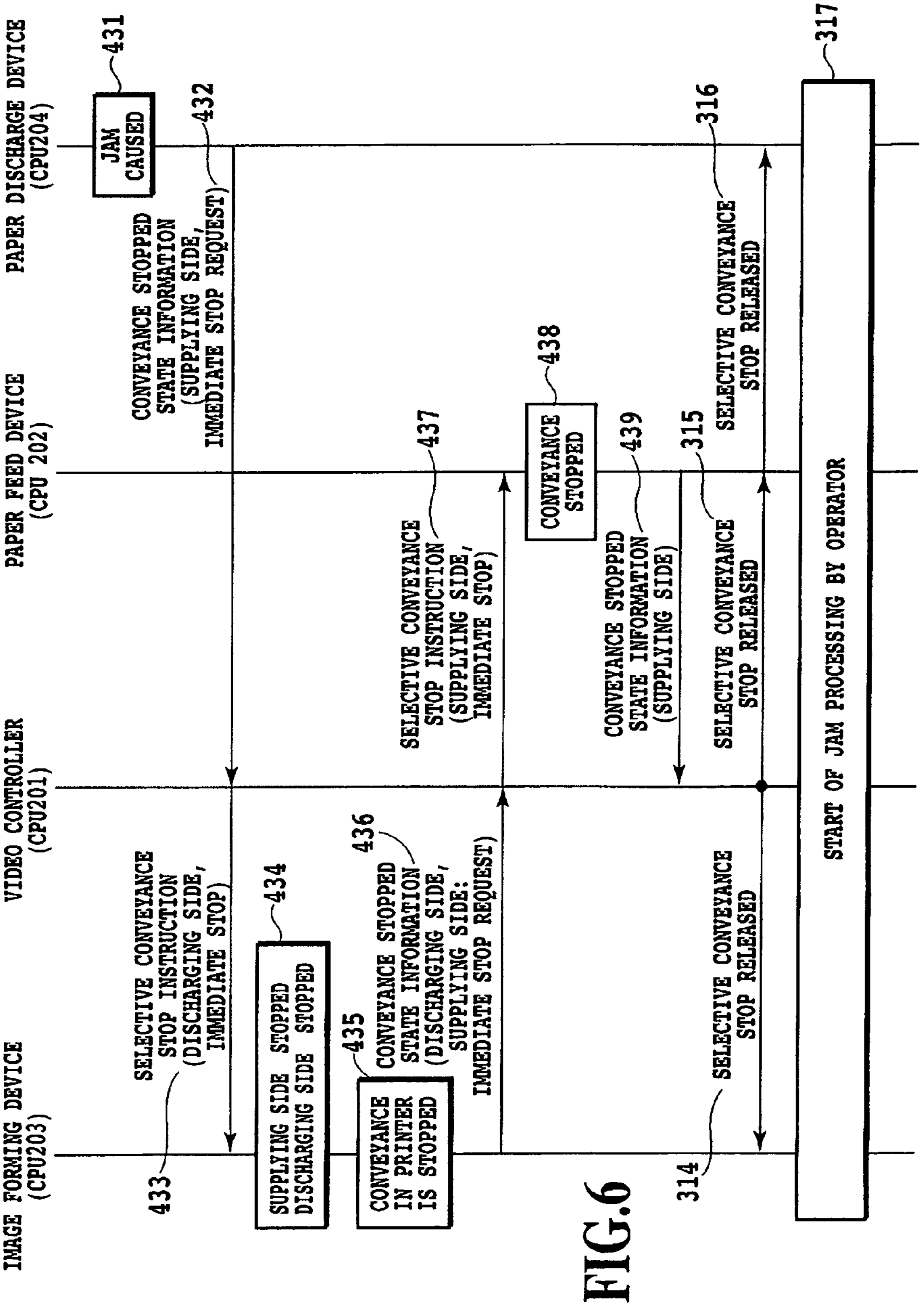

FIG. 6 is a sequential diagram for showing an example of a fourth processing in cases where poor paper feeding (such as a paper jam) is caused in the paper discharge device 103 due to a paper jam or the like. This sequential diagram shows control information and a command (an instruction signal) transmitted/received between the video controller CPU 201 and the paper feed device control CPU 202. Furthermore, this sequential diagram shows control information and a command (an instruction signal) transmitted/received between the video controller CPU 201 and the image forming engine CPU 203. Moreover, this sequential diagram shows control information and a command (an instruction signal) transmitted/received between the video controller CPU 201 and the paper discharge device control CPU 204. Furthermore, this sequential diagram shows a flow of controlling the video controller CPU 201, the paper feed device control CPU 202, the image forming engine CPU 203, and the paper discharge device control CPU 204.

In the present processing example, immediate stop request information is used. That is, the present processing example is configured so that it is possible to request the adjacently-connected devices to stop paper conveyance immediately. With this, in cases where damage to a conveyor motor, a conveyor roller or the like is to be expected to occur, and in cases where another poor paper feeding is expected to be further caused if the paper conveyance is continued, it becomes possible to immediately stop the paper conveyance in the adjacently-connected devices.

When a paper jam is caused in the paper discharge device 103 (Step 431), at Step 432, the paper discharge device control CUP 204 detects the paper jam, and stops paper conveyance in the paper discharge device 103. Then, the paper discharge device control CPU 204 transmits to the video roller CPU 201 conveyance stopped state information showing that the paper conveyance in the paper discharge device 103 is stopped. This conveyance stopped state information includes a request for immediate stop to the image forming device 102.

At Step 433, the video controller CPU 201, which has received the conveyance stopped state information, transmits a selective conveyance stop instruction to the image forming device 102. The image forming device 102, which has received the selective conveyance stop instruction at Step 433, immediately stops the paper conveyance on the supplying side and the discharging side at Steps 434 and 435.

Subsequently, at Step 436, the image forming device 102 transmits to the video controller CPU 201 the conveyance stopped state information showing that conveyance on the supplying side and discharging side in the image forming device 102 is stopped.

At Step 437, the video controller CPU 201, which has received the conveyance stopped state information, transmits to the paper feed device 101 a selective conveyance stop instruction for instructing to immediately stop the paper feed device 101. At Step 438, the paper feed device 101, which has received the selective conveyance stop instruction, stops the paper conveyance.

At Step 439, the paper feed device 101, in which the paper conveyance is stopped, transmits the conveyance stopped state information to the video controller CPU 201. The video controller CPU 201, which has received the conveyance stopped state information, releases the selective conveyance stopped state upon receipt the state information of the conveyance stop from all the devices of the paper feed device 101, the image forming device 102, and the paper discharge device 103. In order to release the selective conveyance stopped state, at Steps 314, 315, and 316, the video controller CPU 201 transmits the instruction to release the selective conveyance stopped state to the image forming device 102, the paper feed device 101, and the paper discharge device 103.

Lastly, at Step 317, an operator starts a normal process for a paper jam and each device returns to a normal sequence.

As described above, according to the present processing example, if it is needed to immediately stop the adjacent devices in cases where each device stops paper conveyance, the paper conveyance can be immediately stopped by utilizing the immediate stop request information. Accordingly, it is possible to reduce damage to the devices due to unnecessary paper conveyance and to prevent an accordion paper jam with multiple folds, which is caused by conveying more paper sheets to a jammed one.

It should be noted that the immediate stop request information described in the fourth processing example can be applied to the sequence of the second processing example.

In the above described first to fourth processing examples, the driving force of the main motor 220 is transferred by using the clutches to the paper feed rollers 112 and 113, the paper feed and convey roller 115, the resist roller 117, the photosensitive drum 118, the fixing device 119, and the paper exit roller 120. The driving system motor on the paper supplying and conveying side in the image forming device 102 and the driving system motor on the paper discharging side in the image forming device 102 may be separately provided to control conveyance operations. It should be noted that the driving system on the paper supplying and conveying side in the image forming device 102 is the paper feed rollers 112 and 113, the paper feed and convey roller 115 and the photosensitive drum 118. The driving system on the paper discharging side in the image forming device 102 is the fixing device 119 and the fixing and discharging device 120.

In addition to these, there can be an embodiment in which a computer reads out programs programmed for the above described processing from a recording medium on which the programs are recorded, and executes the programs. The medium for recording the programs includes, for example, a flexible disk, a hard disk, an optical disk, a magneto-optical disk, a CD-ROM, a CD-R, a magnetic tape, a nonvolatile memory card, and a ROM.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes.

What is claimed is:

1. An image forming system, comprising:

a feeding device which feeds a sheet;

an image forming device which forms an image on the sheet;

a post-processing device which processes the sheet on which the image is formed, the sheet being discharged from the image forming device; and a controlling unit which transmits information for instruction of operation to the image forming device and the post-processing device, wherein the controlling unit transmits to the image forming device and the post-processing device an instruction signal upon receipt of information showing a stop of conveying of a sheet from the feed device, the instruction signal being a signal to make the image forming device and the post-processing device control a conveying operation of sheet, and wherein each of the image forming device and the post-processing device independently determines to continue conveying or to stop conveying a sheet in response to the instruction signal.

2. The image forming system according to claim 1, wherein the image forming device and the post-processing device determine whether or not a conveyable sheet exists in cases where the instruction signal is transmitted, and determine whether or not the conveying operation of the sheet is continued, based on a result of the determination.

3. The image forming system according to claim 1, wherein the image forming device stops conveyance on a side where a sheet is fed from the feeding device in the image forming device and continues conveyance on a side where a sheet is discharged to the post-processing device upon receipt of the instruction signal.

4. The image forming system according to claim 1, wherein the image forming device continues conveyance on a side where a sheet supplying side is fed from the feeding device and a side where a sheet is discharged to the post-processing device in the image forming device upon receipt of the instruction signal.

5. The image forming system according to claim 1, wherein the instruction signal includes status information showing whether or not there are sheets remaining over the image forming device and the feeding device, and wherein the image forming device stops conveyance on a side where a sheet is fed from the feeding device in the image forming device and continues conveyance on a side where a sheet is discharged to the post-processing device based on the status information.

6. An image forming method, comprising:

a feeding step of feeding a sheet;

an image forming step of forming an image on the sheet;

a post-processing step of post-processing the sheet on which an image is formed, the sheet being discharged from an image forming device;

a first transmitting step of transmitting information showing a stop of conveying of a sheet according to a stop of supplying a sheet in the feeding step;

a second transmitting step of transmitting an instruction signal for controlling a conveying operation of a sheet in response to the information showing a stop of conveying of the sheet; and a determination step of determining to stop conveying or to continue conveying a sheet in each of the image forming step and the post-processing step independently in response to the instruction signal.

7. The image forming method according to claim 6, wherein the determination step determines whether or not a conveyable sheet exists in response to the instruction signal, and determines whether or not the sheet conveyance is continued, based on a result of the determination.

8. An image forming system including a feeding device which feeds a sheet, an image forming device which forms an image on the sheet, and a post-processing device which processes the sheet on which an image is formed, the sheet being discharged from the image forming device, comprising:

a first controller configured to control an operation of the feeding device;

a second controller configured to control an operation of the image forming device;

a third controller configured to control an operation of the post-processing device; and a main controller configured to communicate with the first, second, and third controllers, respectively, in order to instruct each of the first, second, and third controllers to operate, wherein the main controller sends instructions to select continuing a conveyance operation to the second and third controllers in response to a notification that indicates information of stopping of sheet conveyance in the feeding device from the first controller, and then the second and third controllers, in response to the instruction from the main controller, independently determine whether to continue a conveyance operation respectively.

9. The image forming system according to claim 8, wherein the second controller, in response to the instruction from the main controller, determines whether there is any sheet that can be convey in the image forming device, and then if so, the second controller continues a conveyance operation, and if not, the second controller stops a conveyance operation.

10. The image forming system according to claim 8, wherein the third controller, in response to the instruction from the main controller, determines whether there is any sheet that can be convey in the post-processing device, and then if so, the third controller continues a conveyance operation, and if not, the third controller stops a conveyance operation.

11. The image forming system according to claim 8, wherein, in the case that a sheet jam occurs in the feeding device, the first controller notifies the main controller of information indicating a stop of sheet feeding.

12. The image forming system according to claim 8, wherein the post-processing device includes a plurality of discharge bins that conveys sheets discharged from the image forming device and outputs the sheets.

13. The image forming system according to claim 8, wherein, after stopping of conveyance operations of the feeding device, the image forming device, and the post-processing device, the main controller outputs information indicating stopping of sheet conveyance in the feeding device.

* * * * *